(12) United States Patent
Seimiya et al.

(10) Patent No.: US 11,009,122 B2
(45) Date of Patent: May 18, 2021

(54) TRANSMISSION CONTROL DEVICE (71) Applicant: HITACHI AUTOMOTIVE SYSTEMS, LTD., Hitachinaka (JP)

(72) Inventors: Masashi Seimiya, Ibaraki (JP); Yoshiyuki Yoshida, Ibaraki (JP); Takashi Matsuoka, Ibaraki (JP); Tomoyasu Sakaguchi, Ibaraki (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 79 days.

(21) Appl. No.: 16/473,447

(22) PCT Filed: Feb. 28, 2018

(86) PCT No.: PCT/JP2018/007430
§ 371 (c)(1),
(2) Date: Jun. 25, 2019

(87) PCT Pub. No.: WO2018/173661
PCT Pub. Date: Sep. 27, 2018

(65) Prior Publication Data
US 2020/0141483 A1 May 7, 2020

(30) Foreign Application Priority Data
Mar. 23, 2017 (JP) .............................. JP2017-056812

(51) Int. Cl.
*F16H 61/02* (2006.01)
(52) U.S. Cl.
CPC ..... *F16H 61/0204* (2013.01); *F16H 2708/22* (2013.01)

(58) Field of Classification Search
CPC ............... F16H 59/44; F16H 2059/663; F16H 2059/666; F16H 61/02; F16H 61/0204;
(Continued)

(56) References Cited

U.S. PATENT DOCUMENTS 5,056,376 A * 10/1991 Moroto ................... F16H 61/02
74/335
9,085,293 B2 7/2015 Maier
(Continued)

FOREIGN PATENT DOCUMENTS

DE 101 63 402 A1 7/2003
EP 1 826 464 A2 8/2007
(Continued)

OTHER PUBLICATIONS

Extended European Patent Search Report issued in corresponding European Patent Application No. 18770282.4 dated Dec. 1, 2020.

*Primary Examiner* — Edwin A Young
(74) *Attorney, Agent, or Firm* — Foley & Lardner LLP (57) ABSTRACT

There is proposed a gearshift control device which can reduce a transmission load due to preshift, and improve fuel efficiency of a vehicle. A gearshift control device which controls a transmission 50 including two systems of power transmission mechanisms, and preshifts the transmission 50 based on a traveling plan during automatic driving of a vehicle. The gearshift control device makes automatic driving preshift execution decision of planning control contents of the transmission 50 based on the traveling plan, and preshift execution decision of deciding whether or not to preshift the transmission based on a control plan of the transmission 50.

12 Claims, 8 Drawing Sheets

(58) Field of Classification Search
CPC ............. F16H 61/0213; F16H 2306/18; F16H 2306/52; F16H 2708/22
See application file for complete search history.

(56) References Cited

U.S. PATENT DOCUMENTS

| | | |
|---|---|---|
| 2007/0199395 A1 | 8/2007 | Ochi et al. |
| 2007/0254775 A1* | 11/2007 | Kishi .................... F16H 61/688 477/115 |
| 2009/0042692 A1* | 2/2009 | Fujimoto ............ F16H 61/0403 477/86 |
| 2010/0024581 A1 | 2/2010 | Ogami |
| 2010/0030437 A1* | 2/2010 | Kim .................... F16H 61/0213 701/65 |
| 2016/0349751 A1 | 12/2016 | Sugimoto |

FOREIGN PATENT DOCUMENTS

| | | |
|---|---|---|
| EP | 2 151 609 A1 | 2/2010 |
| JP | 2007-232047 A | 9/2007 |
| JP | 2010-038229 A | 2/2010 |
| JP | 2011-112147 A | 6/2011 |
| JP | 2016-215934 A | 12/2016 |

* cited by examiner

TRANSMISSION CONTROL DEVICE

TECHNICAL FIELD

The present invention relates to a gearshift control device.

BACKGROUND ART

In recent years, as a system which automates an operation of clutches which are friction mechanisms and an operation of synchronous mesh mechanisms which are mesh mechanisms by using a gear transmission used for a manual transmission, an automated manual transmission (referred to as an "automated MT" below) has been developed. According to the automated MT, when gearshift starts, a clutch which transmits or blocks a torque of an engine which is a driving force source is disengaged, the synchronous mesh mechanisms are switched, and then the clutch is engaged again.

Furthermore, J P 2007-232047 A (PTL 1) discloses a method for selecting upshift standby or downshift standby of a preshift gear based on external information obtaining means such as a navigation device, a radar device or a camera device.

CITATION LIST

Patent Literature

PTL 1: JP 2007-232047 A

SUMMARY OF INVENTION

Technical Problem

Preshift control disclosed in PTL 1 is control of detecting a current traveling gear position, and selecting an upshift side gear position or a downshift side gear position neighbor to the current traveling gear position.

However, according to preshift, to achieve the current gearshift position, a transmission input shaft and a transmission output shaft coupled with a clutch which is not used are selectively coupled by the synchronous mesh mechanisms. Therefore, the coupling with the synchronous mesh mechanism increases an inertia mass to be applied to the transmission output shaft and produces a load, and therefore fuel efficiency is likely to worsen.

It is therefore an object of the present invention to provide a gearshift control device which can reduce a transmission load due to preshift, and improve fuel efficiency of a vehicle.

Solution to Problem

As one example of the present invention, a gearshift control device which controls a transmission including two systems of power transmission mechanisms, and preshifts the transmission based on a traveling plan during automatic driving of a vehicle.

Advantageous Effects of Invention

According to the present invention, it is possible to reduce a transmission load due to preshift, and improve fuel efficiency of a vehicle.

DESCRIPTION OF EMBODIMENTS

An embodiment of the present invention will be described in detail below with reference to FIGS. 1 to 11. The present embodiment relates to a control device and a control method of an automatic transmission. More particularly, the present invention relates to the control device and the control method of the automatic transmission which suitably control a gear transmission used for a car.

First, to quickly meet a gearshift request of a driver, a twin clutch automated MT executes preshift of engaging the other (clutch disengage shaft) during traveling using one of an even-numbered shaft or an odd-numbered shaft.

However, the preshift makes a non-driven shaft a traveling resistance, and therefore is likely to deteriorate fuel efficiency.

In view of this, a configuration example of the control device of the car including the automatic transmission according to the present invention will be described first with reference to FIG. 1.

Figure 1:
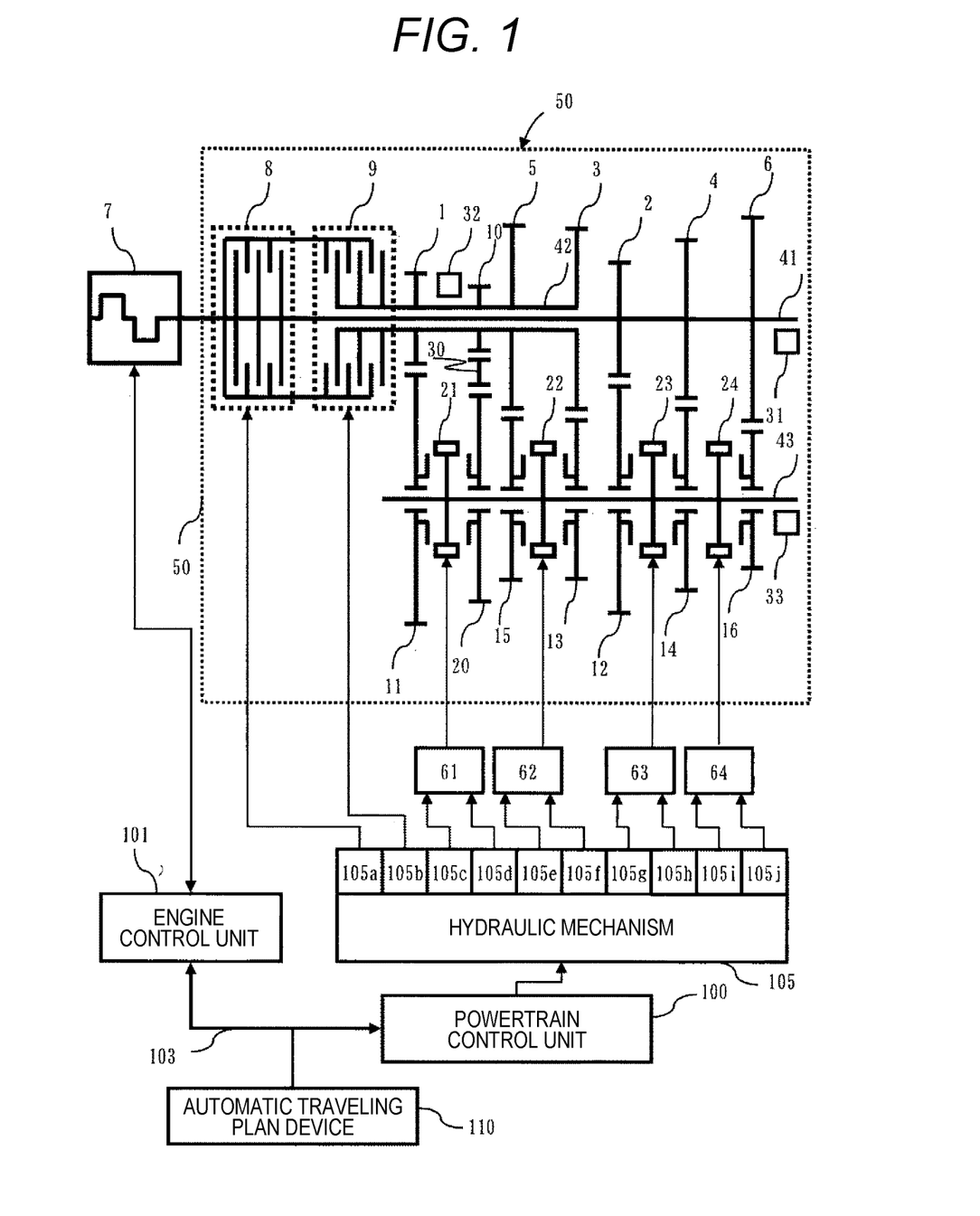
FIG. 1 is a skeleton diagram illustrating a configuration of a control device of an automatic transmission according to one embodiment of the present invention.

FIG. 1 is a skeleton diagram of a system configuration example illustrating one embodiment of the control device (gearshift control device) of the car including an automatic transmission according to the present invention.

An engine 7 which is a driving force source, an engine rotational speed sensor (not illustrated) which measures a rotational speed of the engine 7, an electronic control throttle (not illustrated) which adjusts an engine torque, and a fuel injection device (not illustrated) which injects a fuel amount matching an intake air amount are provided. An engine control unit 101 manipulates the intake air amount, the fuel amount and an ignition timing, so that it is possible to precisely control a torque of the engine 7.

The above-described fuel injection device is an intake port injection system which injects a fuel to an intake port or a cylinder injection system which directly injects the fuel in a cylinder. It is advantageous to use an engine adopting a system which can reduce fuel consumption compared to a driving range (a range determined by an engine torque and an engine rotational speed) requested for the engine, and has good exhaust capability. The driving force source may be not only a gasoline engine but also a diesel engine, a natural gas engine and an electric motor.

An automatic transmission (transmission) 50 includes a first clutch 8, a second clutch 9, a first input shaft 41, a second input shaft 42, an output shaft 43, a first drive gear 1, a second drive gear 2, a reverse drive gear 10, a third drive gear 3, a fourth drive gear 4, a fifth drive gear 5, a sixth drive gear 6, a first driven gear 11, a second driven gear 12, a reverse driven gear 20, a third driven gear 13, a fourth driven gear 14, a fifth driven gear 15, a sixth driven gear 16, an idler gear 30, a first synchronous mesh mechanism 21, a second synchronous mesh mechanism 22, a third synchronous mesh mechanism 23, a fourth synchronous mesh mechanism 24, a rotation sensor 31, a rotation sensor 32 and a rotation sensor 33.

By engaging and disengaging the first clutch 8, it is possible to transmit or block a torque of the engine 7 to the first input shaft 41. Furthermore, by engaging and disengaging the second clutch 9, it is possible to transmit or block the torque of the engine 7 to the second input shaft 42.

Multiplate wet clutches are used for the first clutch and the second clutch 9 in the present embodiment. However, dry single plate clutches may be used for the first clutch 8 and the second clutch 9, and all friction transmission mechanisms can be used.

Furthermore, the first clutch 8 and the second clutch 9 can be also composed of electromagnetic powder clutches.

The second input shaft 42 is hollow, and the first input shaft 41 penetrates the hollow portion of the second input shaft 42, and is configured to be able to make a relative motion in a rotation direction with respect to the second input shaft 42.

The first drive gear 1, the third drive gear 3, the fifth drive gear 5 and the reverse drive gear 10 are fixed to the second input shaft 42, so that the second input shaft 42 is rotatable with respect to the first input shaft 41. Furthermore, the second drive gear 2, the fourth drive gear 4 and the sixth drive gear 6 are fixed to the first input shaft 41, so that the first input shaft 41 is configured to be able to make a relative motion in the rotation direction with respect to the second input shaft 42.

The sensor 31 is provided as means for detecting a rotational speed of the first input shaft 41, and the sensor 32 is provided as means for detecting a rotational speed of the second input shaft 42.

On the other hand, the output shaft 43 includes the first driven gear 11, the second driven gear 12, the third driven gear 13, the fourth driven gear 14, the fifth driven gear 15, the sixth driven gear 16 and a reverse driven gear (not illustrated). The first driven gear 11, the second driven gear 12, the third driven gear 13, the fourth driven gear 14, the fifth driven gear 15, the sixth driven gear 16 and the reverse driven gear 20 are rotatably provided to the output shaft 43.

Furthermore, the sensor 33 is provided as means for detecting a rotational speed of the output shaft 43.

Among these gears, the first drive gear 1 and the first driven gear 11, and the second drive gear 2 and the second driven gear 12 mesh with each other. Furthermore, the third drive gear 3 and the third driven gear 13, and the fourth drive gear 4 and the fourth driven gear 14 mesh with each other. Furthermore, the fifth drive gear 5 and the fifth driven gear 15, and the sixth drive gear 6 and the sixth driven gear 16 mesh with each other. Furthermore, the reverse drive gear 10, the idler gear 30 and the reverse driven gear 20 engage with each other.

Furthermore, the first synchronous mesh mechanism 21 which engages the first driven gear 11 with the output shaft 43, and engages the reverse driven gear 20 with the output shaft 43 is provided between the first driven gear 11 and the reverse driven gear 20.

Furthermore, the third synchronous mesh mechanism 23 which engages the second driven gear 12 with the output shaft 43, and engages the fourth driven gear 14 with the output shaft 43 is provided between the second driven gear 12 and the fourth driven gear 14.

Furthermore, the second synchronous mesh mechanism 22 which engages the fifth driven gear 15 with the output shaft 43, and engages the third driven gear 13 with the output shaft 43 is provided between the fifth driven gear 15 and the third driven gear 13.

Furthermore, the fourth synchronous mesh mechanism 24 which engages the sixth driven gear 16 with the output shaft 43 is provided to the sixth driven gear 16.

A powertrain control unit 100 controls currents of a solenoid valve 105c and a solenoid valve 105d provided to a hydraulic mechanism 105 to control a position or a load of the first synchronous mesh mechanism 21 via a hydraulic piston (not illustrated) and a shift fork (not illustrated) provided in a shift actuator 61, and engage the first driven gear 11 or the reverse driven gear 20, so that it is possible to transmit a rotation torque of the second input shaft 42 to the output shaft 43 via the first synchronous mesh mechanism 21. In this regard, there is employed a configuration where, when the current of the solenoid valve 105d increases, a load is applied in a direction in which the first synchronous mesh mechanism 21 moves toward the first driven gear 11, and when the current of the solenoid valve 105c increases, a load is applied in a direction in which the first synchronous mesh mechanism 21 moves toward the reverse driven gear 20. In addition, the shift actuator 61 includes a position sensor 61a (not illustrated) which measures the position of the first synchronous mesh mechanism 21.

Furthermore, the powertrain control unit 100 controls currents of a solenoid valve 105e and a solenoid valve 105f provided to the hydraulic mechanism 105 to control a position or a load of the second synchronous mesh mechanism via a hydraulic piston (not illustrated) and a shift fork (not illustrated) provided in a shift actuator 62, and engage the fifth driven gear 15 or the third driven gear 13, so that it is possible to transmit a rotation torque of the second input shaft 42 to the output shaft 43 via the second synchronous mesh mechanism 22. In addition, the shift actuator 62 includes a position sensor 62a (not illustrated) which measures the position of the second synchronous mesh mechanism 22.

Furthermore, the powertrain control unit 100 controls currents of a solenoid valve 105g and a solenoid valve 105h provided to the hydraulic mechanism 105 to control a position or a load of the third synchronous mesh mechanism 23 via a hydraulic piston (not illustrated) and a shift fork (not illustrated) provided in a shift actuator 63, and engage the second driven gear 12 or the fourth driven gear 14, so that it is possible to transmit the rotation torque of the first input shaft 41 to the output shaft 43 via the third synchronous mesh mechanism 23. In addition, the shift actuator 63 includes a position sensor 63a (not illustrated) which measures the position of the third synchronous mesh mechanism 23.

Furthermore, the powertrain control unit 100 controls currents of a solenoid valve 105i and a solenoid valve 105j provided to the hydraulic mechanism 105 to control a position or a load of the fourth synchronous mesh mechanism via a hydraulic piston (not illustrated) and a shift fork (not illustrated) provided in a shift actuator 64, and engage the sixth driven gear 16, so that it is possible to transmit the rotation torque of the first input shaft 41 to the output shaft 43 via the fourth synchronous mesh mechanism 24. In addition, the shift actuator 64 includes a position sensor 64a (not illustrated) which measures the position of the fourth synchronous mesh mechanism 24.

The rotation torque of the transmission input shaft transmitted from the first drive gear 1, the second drive gear 2, the third drive gear 3, the fourth drive gear 4, the fifth drive gear 5, the sixth drive gear 6 and the reverse drive gear 10 to the transmission output shaft 43 via the first driven gear 11, the second driven gear 12, the third driven gear 13, the fourth driven gear 14, the fifth driven gear 15, the sixth driven gear 16 and the reverse driven gear 20 is transmitted to an axle (not illustrated) via a differential gear (not illustrated) coupled to the transmission output shaft 43.

Furthermore, the powertrain control unit 100 controls a current of a solenoid valve 105a provided to the hydraulic mechanism 105 to control a pressure plate (not illustrated) provided in the first clutch 8 and control a transmission torque of the first clutch 8.

Furthermore, the powertrain control unit 100 controls a current of a solenoid valve 105b provided to the hydraulic mechanism 105 to control a pressure plate (not illustrated) provided in the second clutch 9 and control a transmission torque of the second clutch 9.

An automatic traveling plan device 110 is connected with a camera which can capture images of a front side, a rear side and lateral sides of a vehicle, and can recognize external environment by image processing, and detect obstacles around the vehicle or detect distances to cars driving ahead. Furthermore, the automatic traveling plan device 110 is connected with a navigation system (not illustrated) which can detect the position of the vehicle to detect the position of the own vehicle by an azimuth sensor, a GPS sensor, a vehicle speed sensor and a steering angle sensor, and read various pieces of map information such as a traveling route to a destination and a road gradient stored in the navigation system, and calculate a traveling plan such as the vehicle speed and a driving force.

The powertrain control unit 100, the engine control unit 101 and the automatic traveling plan device 110 are configured to be able to transmit and receive information to and from each other via communication means 103.

The solenoid valve 105c and the solenoid valve 105d control the shift actuator 61 to mesh the first synchronous mesh mechanism 21 and the first driven gear 11, and engage the second clutch 9 to achieve first gear traveling.

The solenoid valve 105g and the solenoid valve 105h control the shift actuator 63 to mesh the third synchronous mesh mechanism 23 and the second driven gear 12, and engage the first clutch 8 to achieve second gear traveling.

The solenoid valve 105e and the solenoid valve 105f control the shift actuator 62 to mesh the second synchronous mesh mechanism 22 and the third driven gear 13, and engage the second clutch 9 to achieve third gear traveling.

The solenoid valve 105g and the solenoid valve 105h control the shift actuator 63 to mesh the third synchronous mesh mechanism 23 and the fourth driven gear 14, and engage the first clutch 8 to achieve fourth gear traveling.

The solenoid valve 105e and the solenoid valve 105f control the shift actuator 62 to mesh the second synchronous mesh mechanism 22 and the fifth driven gear 15, and engage the second clutch 9 to achieve fifth gear traveling.

The solenoid valve 105i and the solenoid valve 105j control the shift actuator 64 to mesh the fourth synchronous mesh mechanism 24 and the sixth driven gear 16, and engage the first clutch 8 to achieve sixth gear traveling.

The solenoid valve 105c and the solenoid valve 105d control the shift actuator 61 to mesh the first synchronous mesh mechanism 21 and the reverse driven gear 20, and engage the second clutch 9 to achieve reverse gear traveling.

In addition, as a mechanism which operates the first mesh transmission mechanism 21, the second mesh transmission mechanism 22, the third mesh transmission mechanism 23 and the fourth mesh transmission mechanism 24, the hydraulic mechanism which uses the solenoid valves and the hydraulic pistons is formed in the present embodiment. However, the mechanism may be formed by using electric motors and reduction gears instead of the solenoid valves and the hydraulic pistons, may be formed by using electric motors and drums, or may be formed by using other mechanisms which control the mesh transmission mechanisms 21, 22, 23 and 24. Furthermore, when the electric motor is used, the motor may be formed by a so-called direct current motor to which a magnet is fixed and whose windings are rotated, and may be formed by a so-called permanent magnet synchronous motor whose windings are fixed and whose magnet is rotated, i.e., various motors are applicable.

Furthermore, the hydraulic mechanism which uses the solenoid valves is formed in the present embodiment to operate the first clutch 8 and the second clutch 9. However, the clutches may be configured to operate by using the electronic motor and the reduction gear. An electromagnetic coil may be configured to control the pressure plates of the clutches. This configuration is also possible by using other mechanisms which control the first clutch 8 and the second clutch 9.

Figure 2:
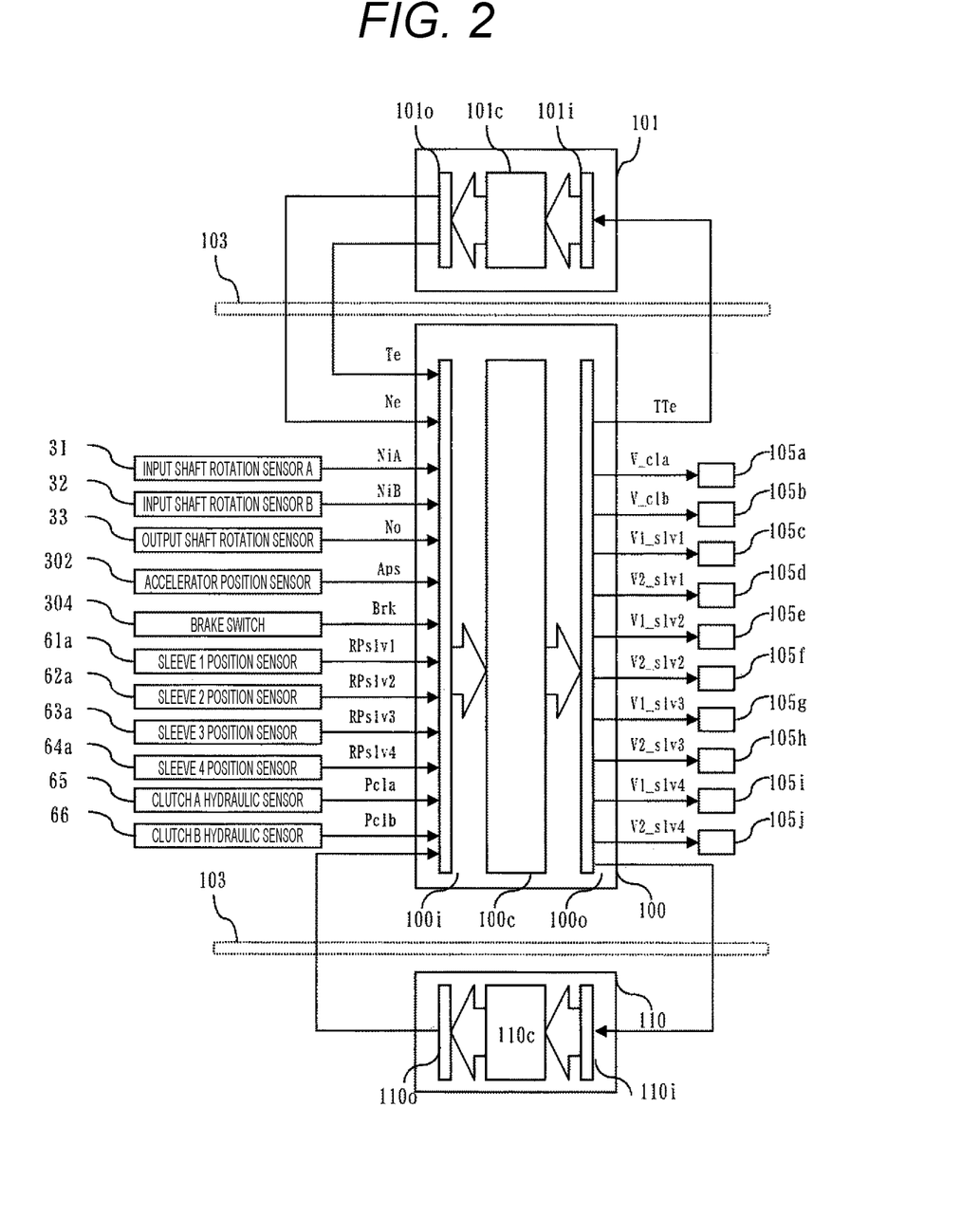
FIG. 2 is a block diagram illustrating an input/output signal relationship between a powertrain control unit 100 which is used for the control device of the automatic transmission according to the one embodiment of the present invention, and an engine control unit 101 and a traveling plan device 110.

FIG. 2 illustrates an input/output signal relationship between the powertrain control unit 100, the engine control unit 101 and the automatic traveling plan device 110. The powertrain control unit 100 is configured as a control unit which includes an input unit 100i, an output unit 100o and a computer 100c. Similarly, the engine control unit 101 is also configured as a control unit which includes an input unit 101i, an output unit 101o and a computer 101c. Similarly, the automatic traveling plan 110 is also configured as a control unit which includes an input unit 110i, an output unit 110o and a computer 110c.

The powertrain control unit 100 transmits an engine torque command value TTe to the engine control unit 101 by using the communication means 103, and the engine control unit 101 controls an intake air amount, a fuel amount and an ignition period (not illustrated) of the engine 7 to realize TTe. Furthermore, detecting means (not illustrated) which detects an engine torque which is an input torque to the transmission is provided in the engine control unit 101. The engine control unit 101 detects a rotational speed Ne of the engine 7 and an engine torque Te generated by the engine 7 to transmit to the transmission control unit 100 by using the communication means 103. The engine torque detecting means may be estimating means which estimates whether or not a torque sensor is used, or may use a parameter of the engine such as an injection pulse width of an injector, a pressure in an intake pipe and an engine rotational speed.

To realize a desired first clutch transmission torque, the powertrain control unit 100 adjusts a voltage V_cla to be applied to the solenoid valve 105a, thereby controls the current of the solenoid valve 105a, and engages or disengages the first clutch 8.

Furthermore, to realize a desired second clutch transmission torque, the powertrain control unit 100 adjusts a voltage V_clb to be applied to the solenoid valve 105b, thereby controls the current of the solenoid valve 105b, and engages or disengages the second clutch 9.

Furthermore, to realize a desired position of the first synchronous mesh mechanism 21, the powertrain control unit 100 adjusts voltages V1_slv1 and V2_slv1 to be applied to the solenoid valves 105c and 105d, thereby controls the currents of the solenoid valves 105c and 105d, and meshes and releases the first synchronous mesh mechanism 21.

Furthermore, to realize a desired position of the second synchronous mesh mechanism 22, the powertrain control unit 100 adjusts voltages V1_slv2 and V2_slv2 to be applied to the solenoid valves 105e and 105f, thereby controls the currents of the solenoid valves 105e and 105f, and meshes and releases the second synchronous mesh mechanism 22.

Furthermore, to realize a desired position of the third synchronous mesh mechanism 23, the powertrain control unit 100 adjusts voltages V1_slv3 and V2_slv3 to be applied to the solenoid valves 105g and 105h, thereby controls the currents of the solenoid valves 105g and 105h, and meshes and releases the third synchronous mesh mechanism 23.

Furthermore, to realize a desired position of the fourth synchronous mesh mechanism 24, the powertrain control unit 100 adjusts voltages V1_slv4 and V2_slv4 to be applied to the solenoid valves 105i and 105j, thereby controls the currents of the solenoid valves 105i and 105j, and meshes and releases the fourth synchronous mesh mechanism 24.

In addition, the powertrain control unit 100 includes a current detection circuit (not illustrated), and changes a voltage output such that the current of each solenoid valve follows a target current and controls the current of each solenoid valve.

Furthermore, the powertrain control unit 100 receives an input of a first input shaft rotational speed NiA, a second input shaft rotational speed NiB and an output shaft rotational speed No from the rotation sensor 31, the rotation sensor 32 and the rotation sensor 33.

Furthermore, the powertrain control unit 100 receives an input of an accelerator pedal step-on amount Aps from an accelerator position sensor 302.

Furthermore, the powertrain control unit 100 receives an input of an ON/OFF signal Brk for detecting whether or not a brake is stepped on from a brake switch 304.

Furthermore, the powertrain control unit 100 receives an input of a sleeve 1 position RPslv1, a sleeve 2 position RPslv2, a sleeve 3 position RPslv3 and a sleeve 4 position RPslv4 which indicate respective stroke positions of the first synchronous mesh mechanism 21, the second synchronous mesh mechanism 22, the third synchronous mesh mechanism 23 and the fourth synchronous mesh mechanism 24 from the sleeve 1 position sensor 61a, the sleeve 2 position sensor 62a, the sleeve 3 position sensor 63a and the sleeve 4 position sensor 64a.

Furthermore, the powertrain control unit 100 receives an input of a clutch A hydraulic sensor 65 which can detect an oil pressure Pcla of the first clutch 8, and a clutch B hydraulic sensor 66 which can detect an oil pressure Pclb of the second clutch 9.

The automatic traveling plan device 110 transmits an automatic driving execution/non-execution state fAutoDry to the powertrain control unit 100 by using the communication means 103. Furthermore, the automatic traveling plan device 110 transmits a future target vehicle speed and target driving force, and a road gradient detected or estimated from the map information to the powertrain control unit 100 by using the communication means 103. Furthermore, the automatic traveling plan device 110 transmits distances to vehicles in the surroundings detected by a camera or a radar to the powertrain control unit 100 by using the communication means 103.

Next, a control method of the control device of the automatic transmission according to the present embodiment will be described with reference to FIGS. 3 to 9.

Figure 3:
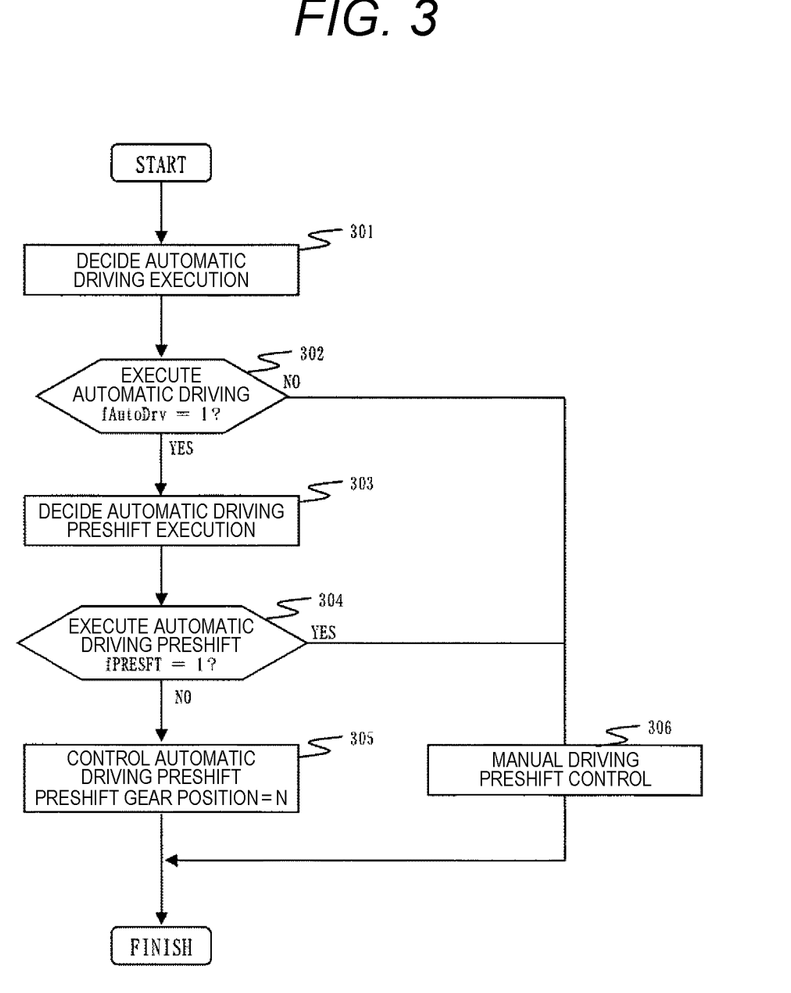
FIG. 3 is a flowchart illustrating an outline of overall control contents of a control method according to the one embodiment of the present invention.

FIG. 3 is a flowchart illustrating an outline of overall control contents of the control method of the automatic transmission according to the first embodiment of the present invention.

Contents in FIG. 3 is programmed to the computer 100c of the powertrain control unit 100, and is repeatedly executed at a predetermined cycle. That is, processing in following steps 301 to 306 is executed by the powertrain control unit 100.

Step 301 is an automatic driving execution deciding process. Whether or not to execute automatic traveling is computed by using information received from the automatic traveling plan device 110 by using the communication means 103 to decide whether or not to execute automatic traveling in step 302.

When fAutoDry is "1" in step 302, it is decided to execute automatic driving, and the flow moves to step 303. When fAutoDry is "0", it is decided not to execute automatic driving, and the flow moves to step 306 to execute existing manual driving preshift control.

Step 303 is an automatic driving preshift execution decision computing process, and computes preshift execution during automatic driving based on a driving force plan value or gradient information. In addition, this process is performed by an automatic driving preshift execution deciding unit (not illustrated).

Step 304 is an automatic driving preshift execution deciding process which uses a computation result in step 303. In addition, this process is performed by an automatic driving preshift execution deciding unit (not illustrated). When fPRESFT is "0", it is decided to cancel automatic driving preshift, and the flow moves to step 305. When fPRESFT is "1", it is decided to execute automatic driving preshift, and the flow moves to step 306 to execute existing manual driving preshift control.

Figure 4:
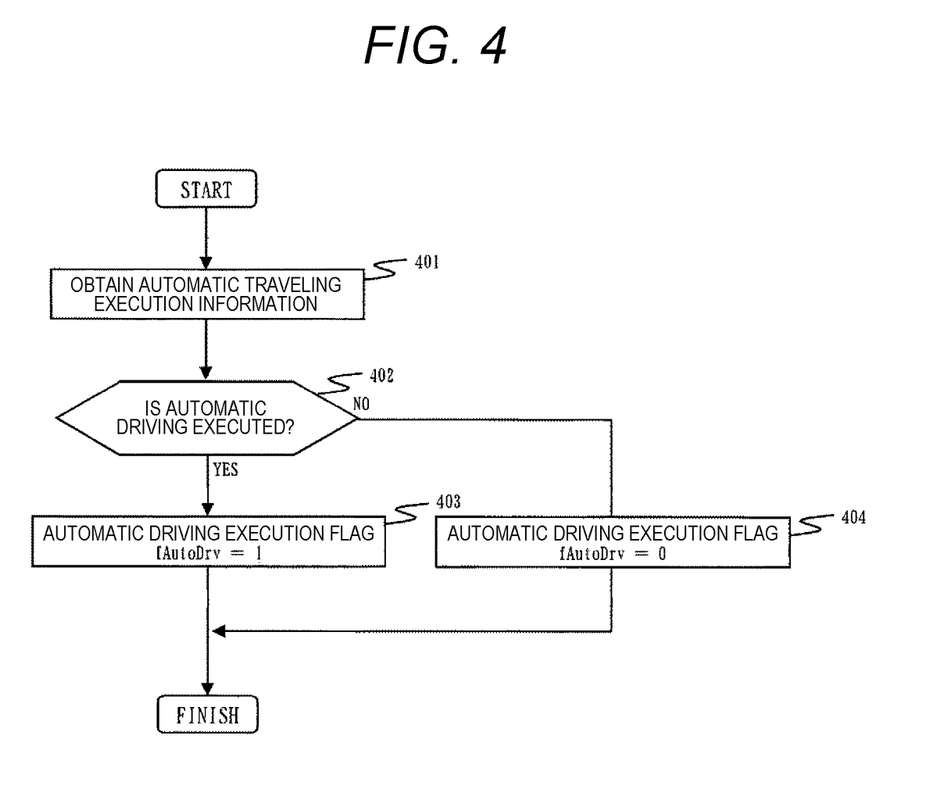
FIG. 4 is a flowchart illustrating an outline of automatic driving execution decision according to the one embodiment of the present invention.

Next, details of step 301 in FIG. 3 will be described with reference to FIG. 4.

Step 401 is an automatic traveling execution information obtaining process. Whether or not automatic driving is executed is obtained from the automatic traveling plan device 110 by using the communication means 103. When automatic driving is executed in step 402, the flow moves to step 403, and an automatic driving execution flag fAutoDry is set to "1". When automatic driving is not executed in step 402, the flow moves to step 404, and the automatic driving execution flag fAutoDry is set to "0".

In this regard, automatic driving execution desirably includes that one of an accelerator operation and a brake operation is automated, and a steering operation may not be automated.

Figure 5:
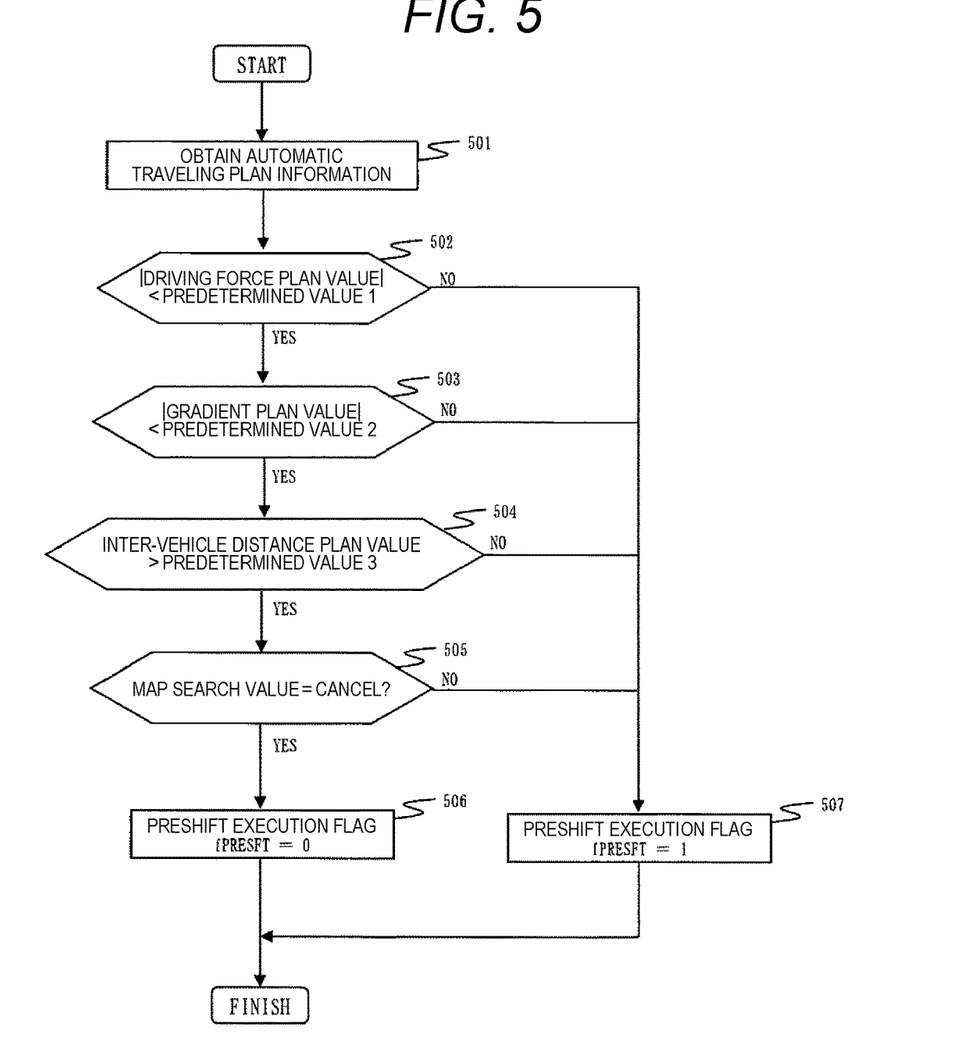
FIG. 5 is a flowchart illustrating an outline of automatic driving execution decision according to the one embodiment of the present invention.

Next, details of step 303 in FIG. 3 will be described in detail with reference to FIG. 5.

Step 501 is an automatic traveling plan information obtaining process. The future target vehicle speed and target driving force, and the road gradient detected or estimated from the map information by the automatic traveling plan device 110, and the distances to the vehicles in the surroundings detected by the camera or the radar are obtained via the communication means 103.

In this regard, the future target vehicle speed and target driving force, and the road gradient are desirably plan information or prediction information of several ms ahead from a current time.

Step 502 is a process of comparing an absolute value of a driving force plan and a predetermined value 1. The driving force plan value obtained in step 501 and the predetermined value 1 are compared, and, when an absolute value of the driving force plan value is smaller, i.e., when a state of a low acceleration or deceleration continues, the flow moves to step 503. When the absolute value of the driving force plan value is larger, the flow moves to step 507, and the preshift execution flag fPRESFT is set to "1".

Figure 6:
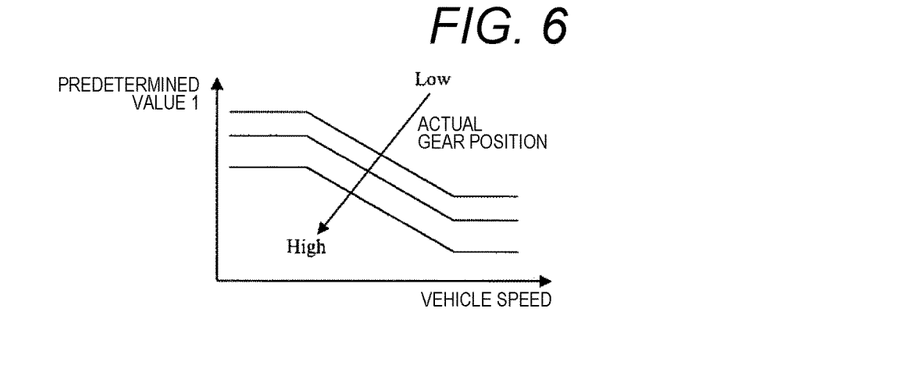
FIG. 6 illustrates a map illustrating settings of a threshold of a driving force plan value according to the one embodiment of the present invention.

In this regard, as illustrated in FIG. 6, the predetermined value 1 is desirably set based on a vehicle speed and an actual gear position, is desirably set to a smaller value as the vehicle speed becomes higher, and is desirably set to a smaller value as the actual gear position becomes a higher gear (toward the sixth gear).

Step 503 is a process of comparing an absolute value of a gradient plan value and a predetermined value 2. The gradient plan value obtained in step 501 and the predetermined value 2 are compared and, when an absolute value of the gradient plan value is smaller, i.e., when a flat road continues, the flow moves to step 504. When the absolute value of the gradient plan value is larger, the flow moves to step 507, and the preshift execution flag fPRESFT is set to "1".

Figure 7:
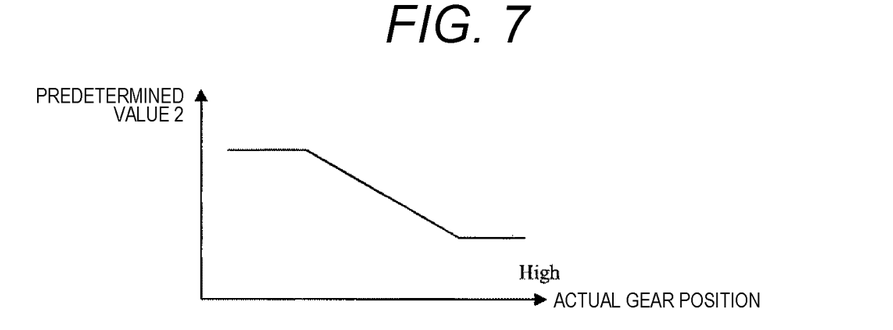
FIG. 7 illustrates a map illustrating settings of a threshold of a gradient plan value according to the one embodiment of the present invention.

In this regard, as illustrated in FIG. 7, the predetermined value 2 is desirably set based on an actual gear position, and is desirably set to a smaller value as the actual gear position becomes a higher gear (toward the sixth gear).

Step 504 is a process of comparing an inter-vehicle distance plan value and a predetermined value 3. The inter-vehicle distance plan value obtained in step 501 and the predetermined value 3 are compared and, when the inter-vehicle distance plan value is larger, i.e., when the inter-vehicle distances to the vehicles in the surroundings are distant, the flow moves to step 505. When the inter-vehicle distance plan value is larger, the flow moves to step 507, and the preshift execution flag fPRESFT is set to "1".

Figure 8:
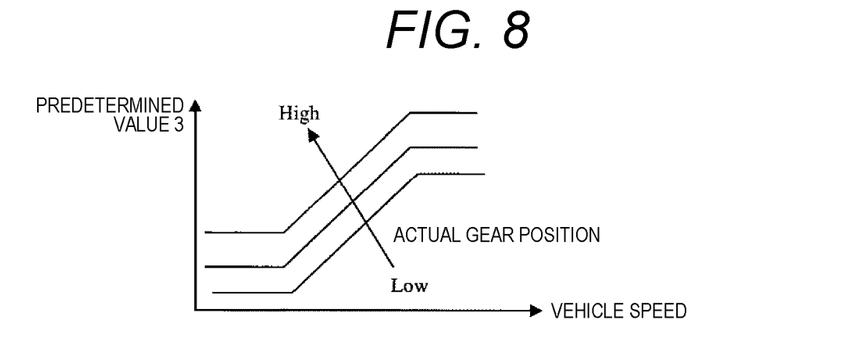
FIG. 8 illustrates a map illustrating settings of a threshold of an inter-vehicle distance plan value according to the one embodiment of the present invention.

In this regard, as illustrated in FIG. 8, the predetermined value 3 is desirably set based on a vehicle speed and an actual gear position, is desirably set to a larger value as the vehicle speed becomes higher, and is desirably set to a larger value as the actual gear position becomes a higher gear (toward the sixth gear).

Figure 9:
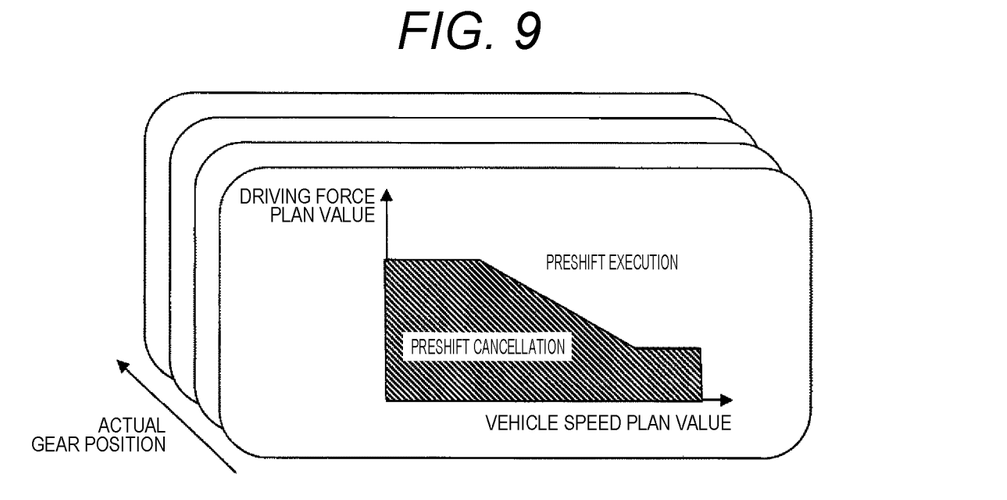
FIG. 9 illustrates a map illustrating settings of a driving range of preshift execution and cancellation according to the one embodiment of the present invention.

Step 505 is a process of searching a map illustrated in FIG. 9 from the vehicle speed plan value and the driving force plan value obtained in step 501 and deciding a map search result. When a map search result indicates "cancel", the flow moves to step 506, and the preshift execution flag fPRESFT is set to "0". When the map search result indicates "execute", the flow moves to step 507, and the preshift execution flag fPRESFT is set to "1".

The map in FIG. 9 is desirably configured to be able to set a range for executing or canceling preshift based on the vehicle speed plan value and the driving force plan value, and can be set per actual gear position.

By employing the above configuration, it is possible to detect based on a traveling plan such as the driving force plan value and the inter-vehicle distance plan value that the state of the low acceleration or deceleration continues, the flat road continues or the state of the distant inter-vehicle distances continues, and cancel preshift. Furthermore, it is possible to search an acceleration/deceleration increase plan, a climb plan or a plan which decreases the inter-vehicle distances from the traveling plan such as the driving force plan value and the inter-vehicle distance plan value, and execute preshift.

Next, an operation during execution of preshift control to a down side in the control device of the automatic transmission according to the control method of the present embodiment will be described with reference to FIG. 10.

Figure 10:
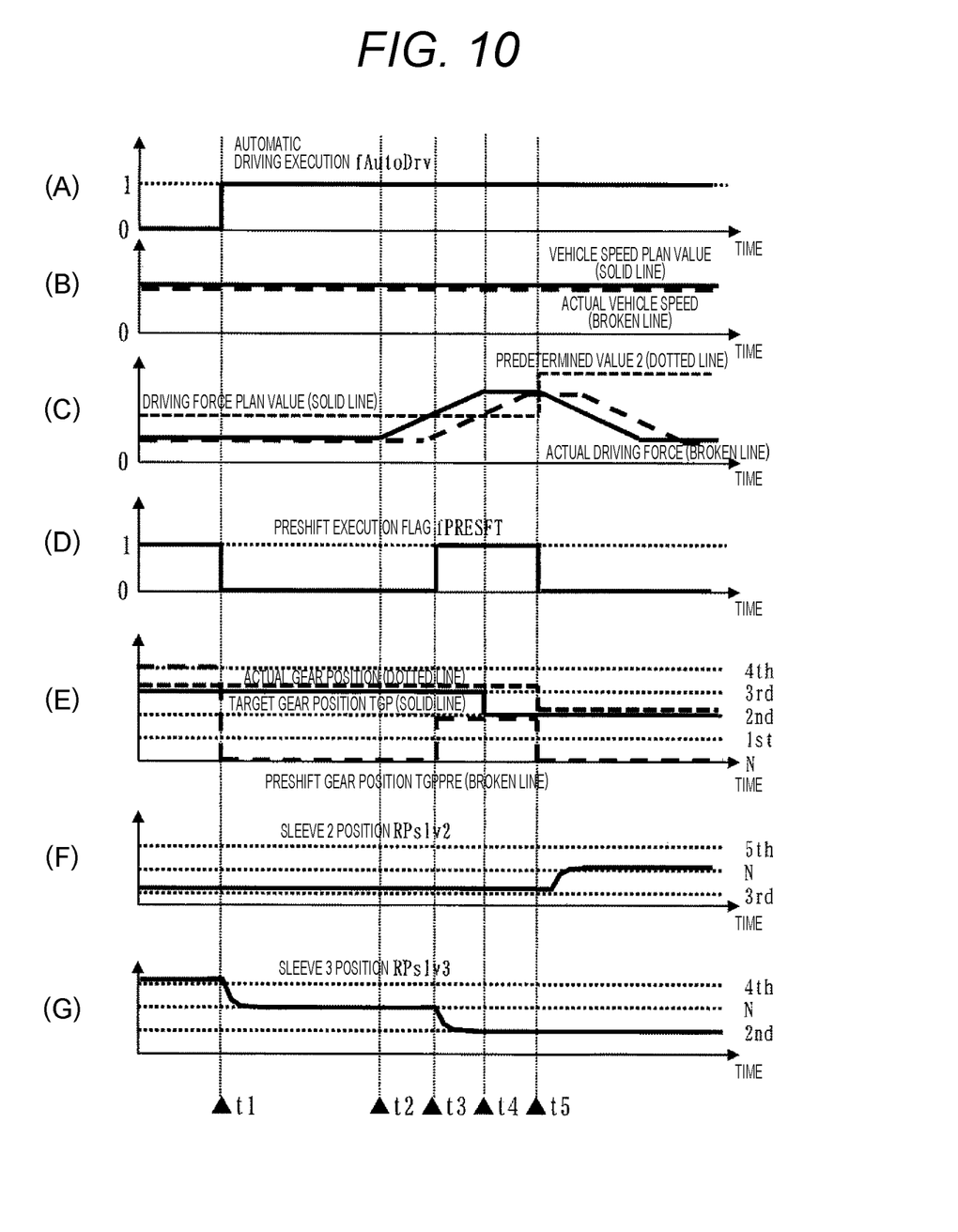
FIG. 10 is a time chart illustrating a preshift operation during downshift according to the one embodiment of the present invention.

FIG. 10 is a time chart during the execution of the preshift control to the down side according to the control method of the present embodiment.

Before a time t1, automatic driving execution fAutoDry is in a state of "0" and indicates a manual traveling state where the driver operates the accelerator or the brake, and indicates a state where a preshift gear position is engaged with the "fourth gear" by existing preshift control.

When automatic driving execution fAutoDry is set to "1" at the time t1, the accelerator or brake operation is automated, the driving force plan value is smaller than the predetermined value 2. Therefore, the preshift execution flag fPRESFT is set to "0", the preshift gear position is set to "N", and then the sleeve 3 position RPslv3 moves from the "fourth gear" to "N".

When an increase in the future actual driving force is detected at a time t2, the driving force plan value starts increasing, and the driving force plan value exceeds the predetermined value 2 at a time t3, the preshift execution flag fPRESFT is set to "1", the preshift gear position is set to the "second gear" according to existing preshift control, and the sleeve 3 position RPslv3 is engaged with the "second gear".

At a time t4, when an actual driving force increases, downshift is executed, and a target gear position is set to the "second gear" to execute gearshift.

When it is decided that the gearshift is finished at a time t5, the predetermined value 2 is re-calculated according to the actual gear position and increases, and the driving force plan value becomes smaller than the predetermined value 2. Therefore, the preshift execution flag fPRESFT is set to "0" again, the preshift gear position is set to "N" and the sleeve 2 position RPslv2 moves to "N".

When the preshift gear position moves to "N" during the gearshift (while the clutch is shifted), the driving force changes since there is no gearshift load resistance. Therefore, the preshift gear position is desirably set to "N" when the gearshift is finished.

Figure 11:
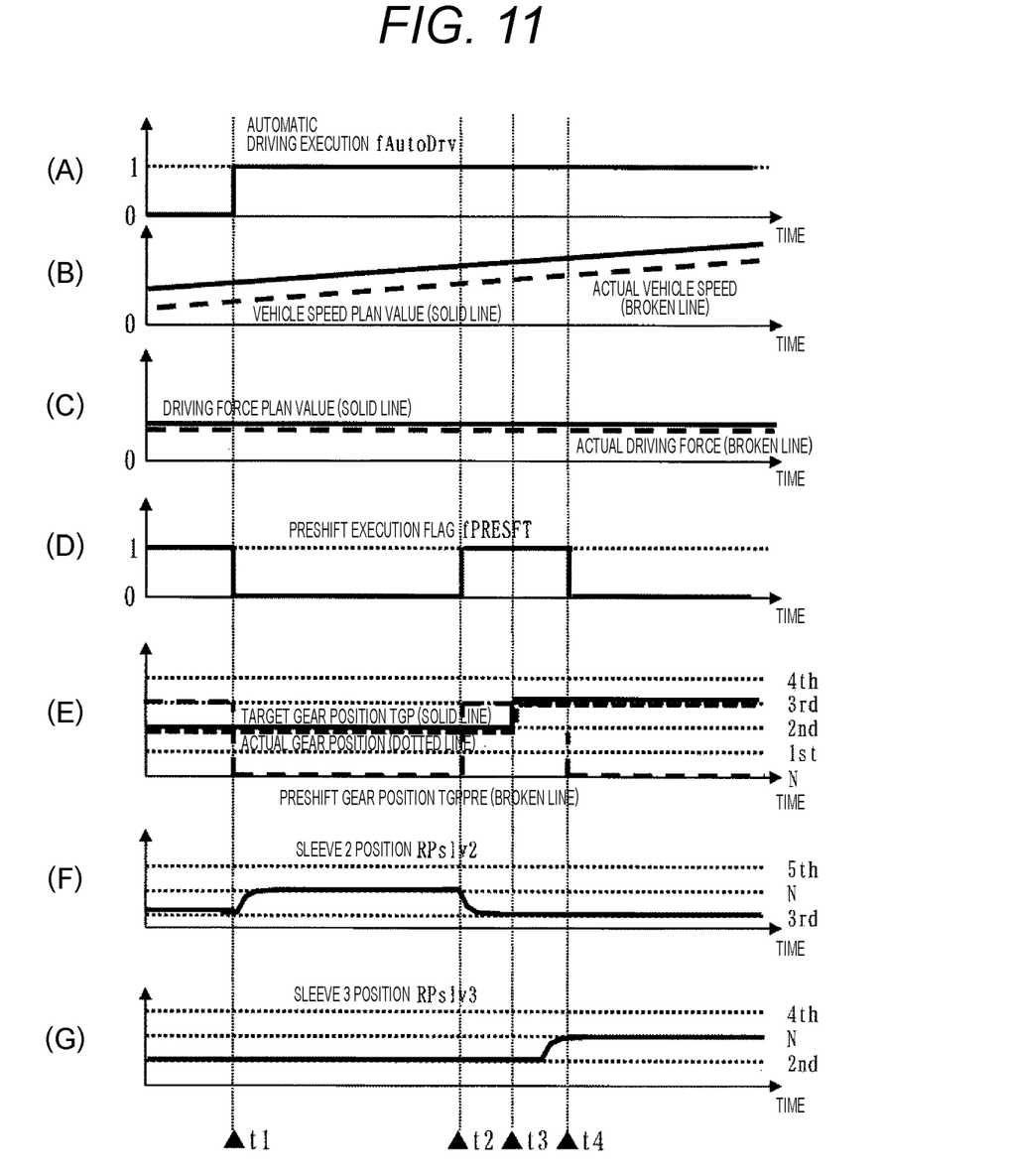
FIG. 11 is a time chart illustrating a preshift operation during upshift according to the one embodiment of the present invention.

Next, an operation during execution of preshift control to an up side in the control device of the automatic transmission according to the control method of the present embodiment will be described with reference to FIG. 11.

Before the time t1, automatic driving execution fAutoDry is in a state of "0" and indicates the manual traveling state where the driver operates the accelerator or the brake, and indicates a state where a preshift gear position is engaged with the "third gear" by existing preshift control.

When automatic driving execution fAutoDry is set to "1" at the time t1, the accelerator or brake operation is automated. When the map illustrated in FIG. 9 is searched from the vehicle speed plan value and the driving force plan value, and the range is decided as the preshift cancellation range, the preshift execution flag fPRESFT is set to "0", the preshift gear position is set to "N", and then the sleeve 2 position RPslv2 moves from the "third gear" to "N".

When the map illustrated in FIG. 9 is searched from the vehicle speed plan value and the driving force plan value at the time t2 and the range is decided as the preshift cancellation range, the preshift execution flag fPRESFT is set to "1", the preshift gear position is set to the "third gear" according to existing preshift control, and the sleeve 2 position RPslv2 is engaged with the "third gear".

At the time t3, when an actual vehicle speed increases, upshift is executed, and the target gear position is set to the "third gear" to execute gearshift.

When it is decided that the gearshift is finished at the time t4, the map illustrated in FIG. 9 is re-calculated according to the actual gear position. When the range is decided as the preshift cancellation range based on the vehicle speed plan value and the driving force plan value, the preshift execution flag fPRESFT is set to "0", the preshift gear position is moved to "N", and then the sleeve 3 position RPslv3 moves from the "second gear" to "N".

When the preshift gear position moves to "N" during the gearshift (while the clutch is shifted), the driving force changes since there is no gearshift load resistance. Therefore, the preshift gear position is desirably set to "N" when the gearshift is finished.

A gearshift control device according to the above present embodiment is a gearshift control device which controls a transmission including two systems of power transmission mechanisms, and preshifts the transmission based on a traveling plan during automatic driving of a vehicle.

Furthermore, the gearshift control device includes: an automatic driving preshift execution deciding unit which plans control contents of the transmission based on the traveling plan; and a preshift execution deciding unit which decides whether or not to preshift the transmission based on a control plan of the transmission.

Furthermore, the traveling plan is calculated based on at least one of a navigation system, a radar, a camera and map information.

Furthermore, the traveling plan is a driving force plan value.

Furthermore, the traveling plan is a vehicle speed plan value.

Furthermore, the traveling plan is a gradient plan value.

Furthermore, the traveling plan is an inter-vehicle distance plan value.

Furthermore, when the driving force plan value is larger than a threshold set in advance according to a gear position and a vehicle speed, the preshift is executed.

Furthermore, when the vehicle speed plan value is larger than a threshold set in advance according to a gear position, the preshift is executed.

Furthermore, when the gradient plan value is larger than a threshold set in advance according to a gear position and a vehicle speed, the preshift is executed.

Furthermore, when the inter-vehicle distance plan value is larger than a threshold set in advance according to a gear position and a vehicle speed, the preshift is executed.

According to the above configuration, it is possible to reduce a transmission load and improve fuel efficiency of the vehicle by canceling preshift while traveling during the automated MT which performs preshift control.

REFERENCE SIGNS LIST

50 transmission (automatic transmission)
100 powertrain control unit
101 engine control unit
105 hydraulic mechanism
110 automatic traveling plan device

The invention claimed is:

1. A transmission control device which controls a transmission including two power transmission systems, wherein a transmission control content of a control plan is planned based on a traveling plan during automatic driving of a vehicle, the transmission control device including an automatic operation pre-shift execution determination section configured to:
    judge whether to execute a pre-shift of the transmission based on the control plan of the transmission, and
    release the pre-shift according to the pre-shift execution judgment.

2. The transmission control device according to claim 1, wherein the traveling plan is calculated based on one of a navigation system, a radar, a camera or map information.

3. The transmission control device according to claim 1, wherein the traveling plan includes a driving force plan value.

4. The transmission control device according to claim 3, wherein, when the driving force plan value is larger than a threshold set in advance according to a gear position and a vehicle speed, the preshift is executed.

5. The transmission control device according to claim 1, wherein the traveling plan includes a vehicle speed plan value.

6. The transmission control device according to claim 5, wherein, when the vehicle speed plan value is larger than a threshold set in advance according to a gear position, the preshift is executed.

7. The transmission control device according to claim 1, wherein the traveling plan includes a gradient plan value.

8. The transmission control device according to claim 7, wherein, when the gradient plan value is larger than a threshold set in advance according to a gear position and a vehicle speed, the preshift is executed.

9. The transmission control device according to claim 1, wherein the traveling plan includes an inter-vehicle distance plan value.

10. The transmission control device according to claim 9, wherein, when the inter-vehicle distance plan value is larger than a threshold set in advance according to a gear position and a vehicle speed, the preshift is executed.

11. A transmission control device that controls a transmission equipped with a pre-shift gearbox based on a traveling plan during automatic operation of a vehicle, comprising:
    a pre-shift execution judgment unit configured to judge whether to execute a pre-shift of the transmission based on the traveling plan of the transmission, and to release the pre-shift according to the pre-shift execution judgment.

12. A transmission control device for controlling a transmission equipped with two power transmission systems, wherein a transmission control content is planned based on a traveling plan during automatic operation of a vehicle, comprising:
    an automatic operation pre-shift execution determination section configured to, when a pre-shift execution judgment is no, cause a pre-shift gear position to be set to N.

* * * * *